(12) United States Patent
Kakalashvili

(10) Patent No.: US 10,686,387 B2
(45) Date of Patent: Jun. 16, 2020

(54) MULTI-TRANSFORMER LLC RESONANT CONVERTER CIRCUIT

(71) Applicant: Murata Manufacturing Co., Ltd., Nagaokakyo-shi, Kyoto-fu (JP)

(72) Inventor: Nana Kakalashvili, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/992,616

(22) Filed: May 30, 2018

(65) Prior Publication Data

US 2018/0351469 A1    Dec. 6, 2018

Related U.S. Application Data

(60) Provisional application No. 62/512,794, filed on May 31, 2017.

(51) Int. Cl.
*H02M 3/335* (2006.01)
*H02M 7/48* (2007.01)
*H02M 1/34* (2007.01)
*H02M 1/14* (2006.01)
*H02M 1/00* (2006.01)

(52) U.S. Cl.
CPC ......... *H02M 3/33592* (2013.01); *H02M 1/14* (2013.01); *H02M 1/34* (2013.01); *H02M 7/4826* (2013.01); *H02M 2001/0048* (2013.01); *H02M 2001/0054* (2013.01); *H02M 2001/0058* (2013.01); *H02M 2007/4811* (2013.01); *H02M 2007/4815* (2013.01)

(58) Field of Classification Search
CPC ....... H02M 3/1584; H02M 2007/4811; H02M 2007/4815; H02M 7/4826; H02M 2001/0048; H02M 2001/0054; H02M 2001/0058; H02M 2001/0064
See application file for complete search history.

(56) References Cited

U.S. PATENT DOCUMENTS 8,629,627 B2    1/2014  Cohen et al.
2009/0168461 A1*  7/2009  Nakahori .......... H02M 3/33561
                                        363/17

(Continued)

*Primary Examiner* — Gary L Laxton
*Assistant Examiner* — Ivan Laboy
(74) *Attorney, Agent, or Firm* — Keating & Bennett, LLP

(57) ABSTRACT

An LLC converter includes a resonant circuit connected to a DC input voltage, a switching circuit connected to the DC input voltage, transformers each including primary windings and secondary windings, and synchronous rectifiers each connected to one secondary winding and to ground. The primary windings of the transformers include a first primary winding and a second primary winding. The first primary windings of the transformers are connected in series, and the second primary windings of each of the plurality of transformers are connected in series. The series-connected first primary windings and the series-connected second primary windings are directly connected in parallel with the resonant circuit. A first current from a first switch flows into the series-connected first primary windings, and a second current from a second switch flows into the series-connected second primary windings. Currents from each of the secondary windings are equal or substantially equal.

20 Claims, 3 Drawing Sheets

(56) References Cited

U.S. PATENT DOCUMENTS

| | | | | |
|---|---|---|---|---|
| 2010/0026095 A1* | 2/2010 | Phadke | ............... | H02M 3/285 |
| | | | | 307/31 |
| 2011/0007527 A1* | 1/2011 | Liu | ............... | H02M 3/33561 |
| | | | | 363/21.02 |
| 2011/0305047 A1* | 12/2011 | Jungreis | ............... | H02M 1/08 |
| | | | | 363/21.02 |
| 2012/0275197 A1* | 11/2012 | Yan | ............... | H02M 3/33592 |
| | | | | 363/21.02 |
| 2014/0153293 A1* | 6/2014 | Chang | ............... | H02M 3/3376 |
| | | | | 363/21.02 |
| 2014/0362616 A1* | 12/2014 | An | ............... | H02M 3/3376 |
| | | | | 363/25 |
| 2017/0155332 A1* | 6/2017 | Sigamani | ............... | H01F 38/00 |
| 2018/0138801 A1* | 5/2018 | Chen | ............... | H02M 7/003 |
| 2018/0159425 A1* | 6/2018 | Hwang | ............... | H02M 3/285 |
| 2018/0191235 A1* | 7/2018 | Chen | ............... | H02M 3/33592 |

* cited by examiner

MULTI-TRANSFORMER LLC RESONANT CONVERTER CIRCUIT

BACKGROUND OF THE INVENTION

1. Field of the Invention

The present invention relates to power converters. More specifically, the present invention relates to a multi-transformer resonant DC-DC converter circuit, e.g., an LLC converter including two inductors and a capacitor that reduce transformer core losses.

2. Description of the Related Art

In high-power and high-load-current applications, most losses in an LLC converter come from synchronous rectifiers, transformer cores, conductive windings, and body diodes of the metal-oxide-semiconductor field-effect transistors (MOSFETs). To achieve higher efficiency, LLC resonant converters are designed to operate with zero-voltage switching (ZVS) that requires a large magnetizing current. Therefore, the peak current of the LLC converter is higher than a hard-switching converter.

Improved switching devices, such as gallium nitride (GAN) devices, and new magnetic materials allow for a significant increase in switching frequency. For high-frequency LLC converter operation, magnetic-core loss limits higher frequency operation and increases converter volume. Thus, it is desirable to reduce both core size and component losses. Magnetic-flux cancellation can be used to reduce both core size and component losses. Magnetic-flux cancellation requires reducing high-magnetic core loss caused by high-magnetic flux excitation. Magnetic-flux cancellation can be used to reduce magnetic loss and transformer core size.

One known LLC converter described by Cohen (U.S. Pat. No. 8,629,627) attempts to address these problems. However, Cohen's converter has a disadvantage in that the transformer working conditions are the same as in previous conventional LLC converter circuits in that the transformer must store a significant amount of energy. These design constraints require a large transformer core that results in high conductive losses in the transformer. Also, the losses from the synchronous-rectifiers MOSFETs are high. When the LLC converter is operating at frequencies below the resonant frequency, the power switch MOSFETs and the synchronous rectifier MOSFETs are turned off when the current through the MOSFETs is not zero. This non-zero-current switching (non-ZCS) reduces LLC converter efficiency when operating at frequencies below the resonant frequency.

In conventional LLC converters, the difference between the resonant current and the magnetizing current passes through the transformer and the secondary-side rectifier, and then power is delivered to the load. When the switching frequency is above the resonant frequency, the resonant half cycle is not completed and interrupted by the start of the other half of the switching cycle, which results in the power switches having increased turn off losses and in the secondary-side rectifiers having higher switching losses.

SUMMARY OF THE INVENTION

To overcome the problems described above, preferred embodiments of the present invention provide an LLC converter that provides a direct current (DC) output to a load from a DC input. The LLC converter includes (i) a resonant circuit, (ii) a switching circuit, (iii) a current-sharing circuit, and (iv) a plurality of transformers, each including a plurality of primary and secondary windings, and (v) a rectification circuit. The primary windings of the plurality of transformers are connected in series, and the series-connected primary windings are connected with the resonant circuit. The secondary windings of each transformer provide a matching current to the load.

The primary windings of the transformers and the freewheeling diodes that connect the primary windings provide separate paths that allow the magnetizing-inductance-current energy stored in the transformers during a previous cycle to be transferred back to the DC input. This allows the size of the transformer to be reduced due to ripple-current cancellation and magnetic-flux cancellation. As a result, magnetic core losses, input-capacitor current ripple, and MOSFET losses are reduced by eliminating losses from the MOSFET body diodes. Schottky diodes or ultrafast recovery diodes that have lower forward voltage drops than the MOSFET body diodes (which can be approximately 2 V) can be used. Also, losses in the synchronous rectifier MOSFETs are reduced because ZCS is used before terminating the synchronous rectifier MOSFET cycle. A conventional feedback loop can be used to control the synchronous rectifier MOSFET cycle depending on load and input voltage. As a result, the LLC converter efficiency is improved, even if the LLC converter is operated below the resonant frequency. Due to magnetic-flux cancellation, the volume of the transformer is reduced in high-current-load applications, allowing for a reduction in conduction losses of the secondary winding and core losses of each transformer.

According to a preferred embodiment of the present invention, an LLC converter outputs a DC output voltage from a DC input voltage and includes a resonant circuit including a plurality of inductors connected to the DC input voltage, a switching circuit including a plurality of switches connected to the DC input voltage, a plurality of transformers each including a plurality of primary windings and a plurality of secondary windings, and a plurality of synchronous rectifiers each connected to one of the plurality of secondary windings and to ground. The plurality of primary windings of each of the plurality of transformers includes a first primary winding and a second primary winding. The first primary windings of each of the plurality of transformers are connected in series. The second primary windings of each of the plurality of transformers are connected in series. The series-connected first primary windings are directly connected in parallel with the resonant circuit. The series-connected second primary windings are directly connected in parallel with the resonant circuit. A first current from a first switch of the plurality of switches flows into the series-connected first primary windings. A second current from a second switch of the plurality of switches flows into the series-connected second primary windings. Currents from each of the plurality of secondary windings are equal or substantially equal.

A current through the series-connected first primary windings preferably flows in an opposite direction to a current through the series-connected second primary windings. Preferably, the LLC converter further includes a plurality of capacitors, and a corresponding capacitor of the plurality of capacitors is connected in parallel with a corresponding switch of the plurality of switches. Preferably, the LLC converter further includes a plurality of freewheeling diodes, and a corresponding freewheeling diode of the plurality of freewheeling diodes is connected in series with a corresponding switch of the plurality of switches. Preferably, a terminal of a first inductor of the plurality of inductors is connected in series with the series-connected first primary windings, and a terminal of a second inductor of the plurality of inductors is connected in series with the series-connected second primary windings. A turns ratio of the first primary winding to the second primary winding of each of the plurality of transformers preferably is 1:1. The LLC converter preferably further includes a control circuit that drives the plurality of switches and the plurality of synchronous rectifiers on and off. In a current cycle, energy stored in the plurality of transformers during a previous cycle is preferably transferred back to the DC input voltage.

According to a preferred embodiment of the present invention, an LLC converter outputs a DC output voltage from a DC input voltage and includes a resonant circuit connected to the DC input voltage, a switching circuit including a first switch including a first terminal connected to the resonant circuit and to the DC input voltage and a second switch including a first terminal connected to the resonant circuit, a current-sharing circuit connected between the first and second switches, first and second transformers each including first and second primary windings, and a rectification circuit connected to the first and second transformers and to the DC output voltage. The second terminal of the first switch is connected to the first primary winding of the first transformer. The second terminal of the second switch is connected to the second primary winding of the first transformer. The first primary windings of the first and second transformers are connected in series. The second primary windings of the first and second transformers are connected in series. The first primary winding of the second transformer is connected to the resonant circuit. The second primary windings of the first and second transformers are connected to the resonant circuit. The current-sharing circuit provides current paths so that, when both of the first and second switches are off, energy stored in the first and second transformers is transferred back to the DC input voltage.

Preferably, the resonant circuit includes first and second capacitors connected in series and first and second inductors connected to a node between the first and second capacitors; the first inductor is connected to the first primary winding of the second transformer; and the second inductor is connected to the second primary winding of the first transformer. Preferably, the current-sharing circuit includes first and second freewheeling diodes; an anode of the first freewheeling diode is connected to a second terminal of the second switch; a cathode of the first freewheeling diode is connected to the first terminal of the first switch; an anode of the second freewheeling diode is connected to the first terminal of the second switch; and a cathode of the second freewheeling diode is connected to a second terminal of the first switch.

Each of the first and second transformers preferably includes first and second secondary windings. Currents from the first and second secondary windings of the first and second transformers preferably are equal or substantially equal.

A current through the first primary windings of the first and second transformers preferably flows in an opposite direction to a current through the second primary windings of the first and second transformers. The LLC converter preferably further includes a first capacitor connected in parallel with the first switch and a second capacitor connected in parallel with the second switch. A turns ratio of the first primary winding to the second primary winding of each of the first and second transformers preferably is 1:1. The LLC converter preferably further includes a control circuit that provides drive signals to the rectification circuit and to the first and second switches of the switching circuit.

Preferably, the rectification circuit includes first, second, third, and fourth synchronous rectifiers, and each of the first, second, third, and fourth synchronous rectifiers is connected to one of the first and second transformers and is connected to ground. The first, second, third, and fourth synchronous rectifiers preferably are switched on and off at zero current. The first and second switches preferably are switched at a frequency below a resonant frequency of the resonant circuit.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

Figure 1:
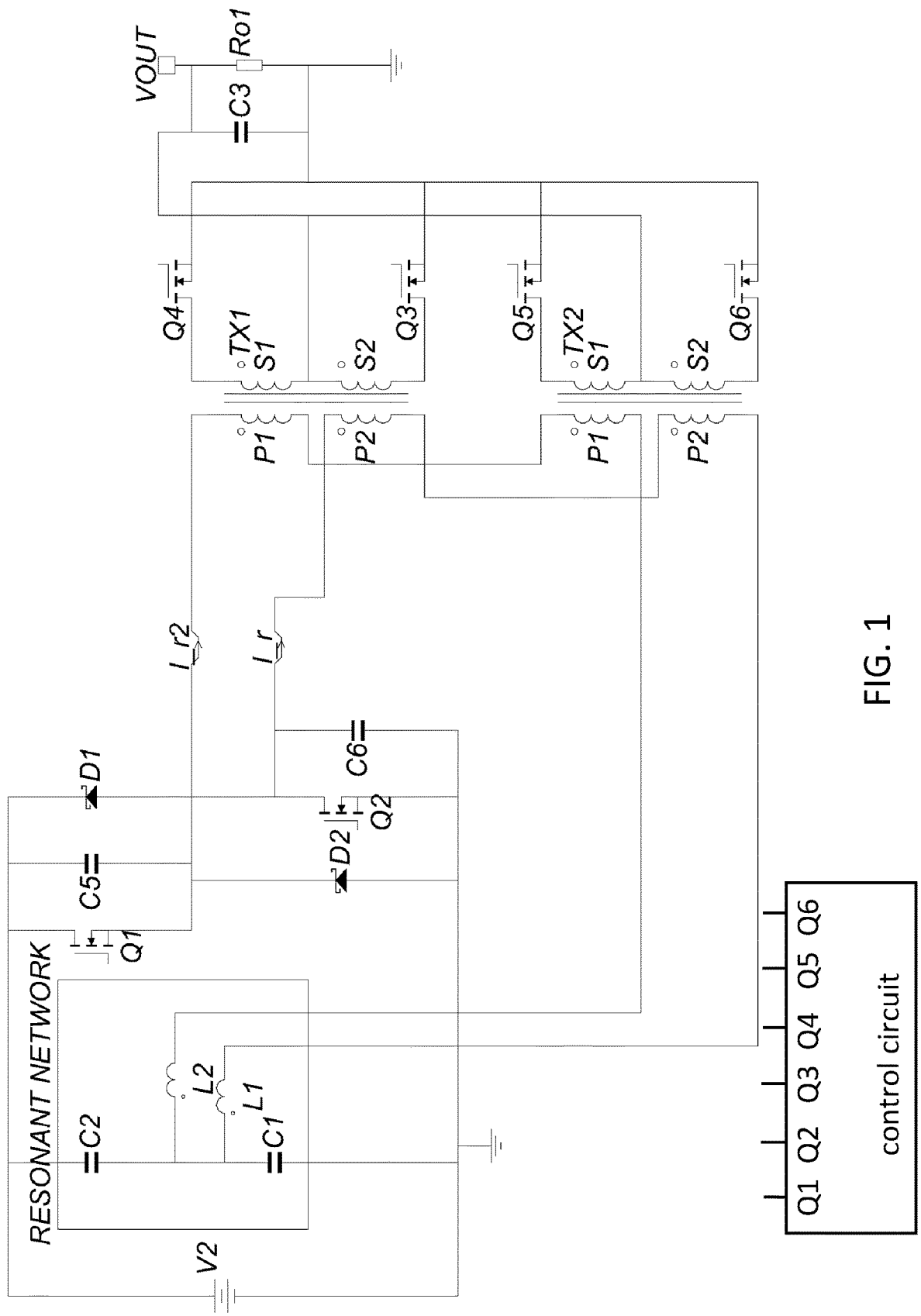
FIG. 1 illustrates an exemplary circuit diagram of a multi-transformer resonant LLC converter according to a preferred embodiment of the present invention.

The LLC converter of FIG. 1 reduces transformer size, transformer-core losses, synchronous-rectifier MOSFET losses, and MOSFET-body-diode conduction losses. The LLC converter of FIG. 1 equally distributes current to the synchronous-rectifier MOSFETs, while the two transformers have the same magnetizing and primary currents. As a result, the load current in each secondary side of the two transformers matches or is substantially the same.

As shown in FIG. 1, the LLC converter includes an input voltage V2; a resonant circuit including inductors L1, L2 and capacitors C1, C2; power switches Q1, Q2; capacitors C5, C6; freewheeling diodes D1, D2; transformers TX1, TX2; synchronous rectifiers Q3-Q6; filter capacitor C3; and output voltage Vout connected to load Rol. Also, as shown in FIG. 1, transformers TX1, Tx2 each include two primary windings P1, P2 and two secondary windings S1, S2.

In the resonant circuit of FIG. 1, capacitors C1, C2 are connected in series between the input voltage V2 and ground. FIG. 1 shows that the primary windings P1 of transformers TX1, TX2 are connected in series and that the primary windings P2 of transformers TX1, TX2 are connected in series. First terminals of both inductors L2 and L3 are connected to each other and are connected to a point between the capacitors C1, C2. The resonant circuit is connected with the series-connected primary windings P1, P2 of the transformers TX1, TX2. The second terminal of inductor L1 is connected in series with the primary windings P2 of the transformers TX1, TX2. The second terminal of the inductor L2 is connected in series with the primary windings P1 of transformers TX1, TX2.

In FIG. 1, the switching circuit includes power switches Q1, Q2, and a current-sharing circuit includes freewheeling diodes D1, D2. Power switch Q1 is connected in parallel with capacitor C5 between the input voltage V2 and the cathode of freewheeling diode D2. The anode of freewheeling diode D2 is connected to ground. Power switch Q2 is connected in parallel with capacitor C6 between ground and the anode of freewheeling diode D1. Current I_r2 shown in FIG. 2B from power switch Q1 flows into the primary windings P1 of transformer TX1, TX2. Current I_r shown in FIG. 2B from power switch Q2 flows in the primary windings P2 of transformers TX1, TX2. Capacitors C5, C6 are connected in parallel with the power switches Q1, Q2 to reduce the switching turn off losses of the power switches Q1, Q2.

On the secondary side, as shown in FIG. 1, the secondary windings S1, S2 of transformer Tx1 are connected in series with a center tap grounded, and the secondary windings S1, S2 of transformer Tx2 are connected in series with a center tap grounded. Each of the secondary windings S1, S2 for each transformer Tx1, Tx2 is connected to one of the synchronous rectifiers Q3-Q6. A node between the series-connected secondary windings S1, S2 for each transformer Tx1, Tx2 is connected to the output voltage Vout, and each of the synchronous rectifiers Q3-Q6 is connected to ground.

As shown in FIG. 1, a control circuit drives the power switches Q1, Q2 and the synchronous rectifiers Q3-Q6 on and off with high frequency pulses. Any suitable control circuit can be used. Although the control circuit is shown on the primary side LLC converter in FIG. 1, the control circuit can be located on the secondary side. It is also possible to provide more than one control circuit. For example, one control circuit can be located on the primary side to drive the power switches Q1, Q2, and another control circuit can be located on the secondary side to drive the synchronous rectifiers Q3-Q6. The control circuit(s) can use known control techniques to control the power switches Q1, Q2 and the synchronous rectifiers Q3-Q6. The control circuit normally operates the LLC converter in a region where the input impedance of the resonant circuit is inductive such that the impedance of the resonant circuit increases with increasing frequency. The control circuit can control power flow by changing the operating frequency of the LLC converter: increasing the frequency to reduce power, and decreasing the frequency to increase power. At higher input voltages when a step down gain is required, the control circuit operates the LLC converter at switching frequencies above the resonant frequency. The control circuit can drive the half bridge of the LLC converter in complementary mode with a fixed duty cycle and with some dead time. The control circuit can drive the synchronous rectifiers independently from the power switches Q1, Q2. The control circuit can determine the turn on time of the synchronous rectifiers Q3-Q6 by sensing the drain-source voltage of the synchronous rectifiers Q3-Q6 by detecting the body diode conduction time of the synchronous rectifiers Q3-Q6.

Figure 2A:
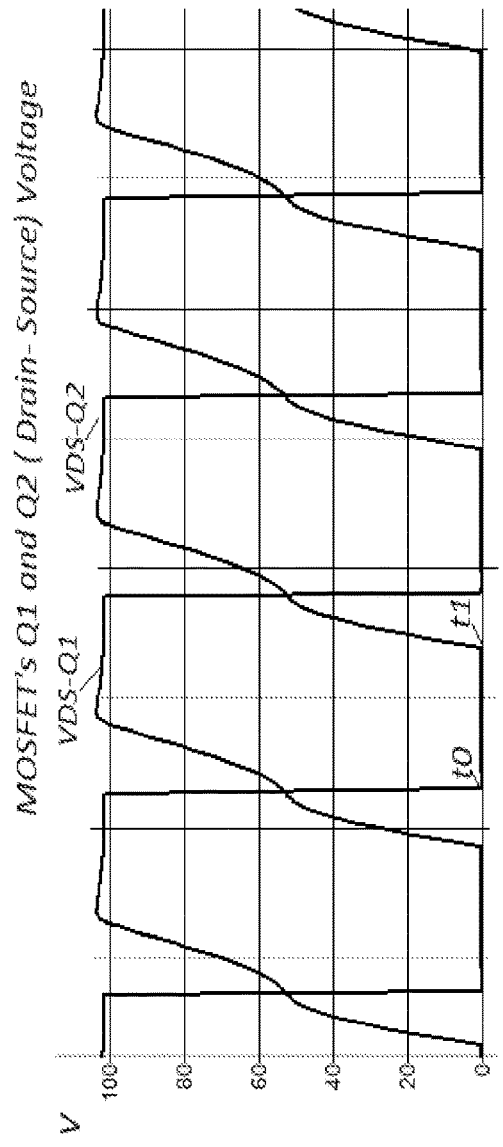
FIGS. 2A and 2B illustrate exemplary voltage and current waveforms at several points in the LLC converter circuit of FIG. 1.
Figure 2B:
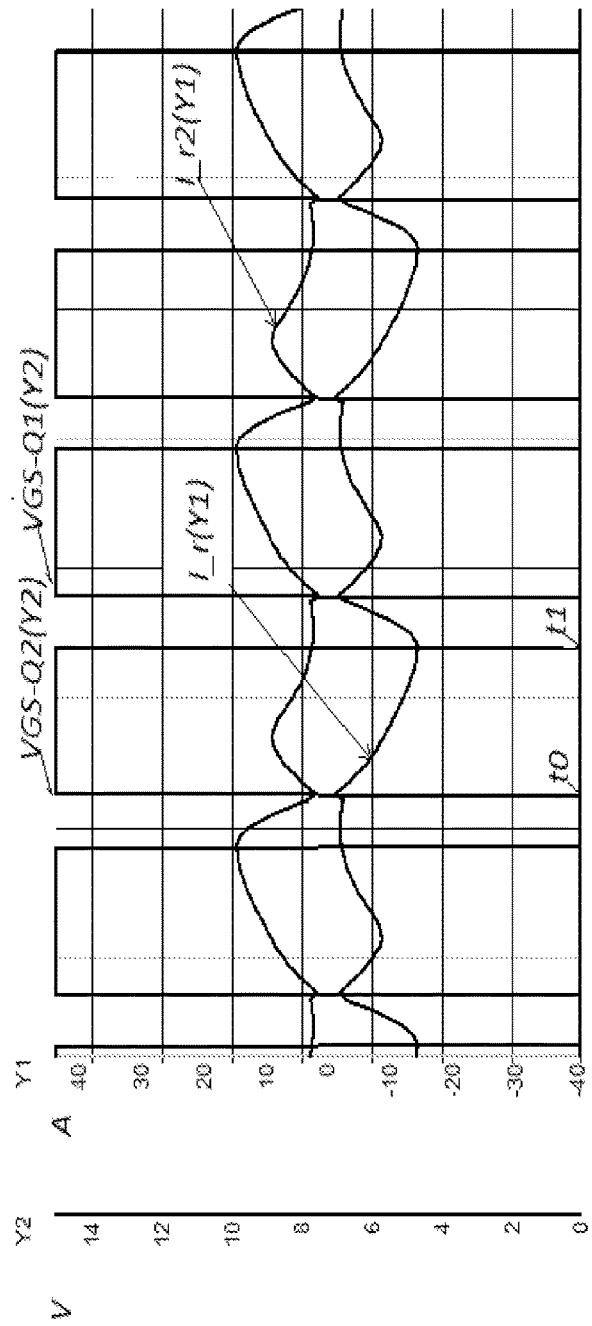

Referring to FIGS. 2A and 2B, when power switch Q1 is turned on and power switch Q2 is turned off during time period (t0-t1) current I_r2 flows through the primary windings P1 of both transformers TX1, TX2, resonant inductor L2, and resonant capacitors C1, C2. As shown in FIG. 3B, the primary winding voltage on capacitor C2 can be similar to a conventional LLC converter.

At the same time, the secondary windings S1 of transformers TX1, TX2 provide currents I_Q3 and I_Q5 to the load Ro1. Waveforms for the gate-source signals VGS_Q1 and VGS_Q2 for power switches Q1 and Q2 are shown in FIG. 2B. In FIGS. 2A and 2B, at time t1, the gate-source signal VGS_Q2 is reduced to turn off the power switch Q2, and the peak current of the current I_r2 is high. However, the drain-source voltage VDS-Q2 rises slowly because the capacitor C6 is connected in parallel with the power switch Q2. When current I_r2 reaches zero, the power switch Q1 is turned on with ZCS and ZVS. Then, the voltage on the capacitor C6 rises to the input voltage level, and the current I_r2 continues to flow through the freewheeling diode D1. The current direction is opposite to the current I_r, which causes the current cancellation effect.

At time t1, when power switch Q1 is turned off and power switch Q2 is still off, the primary windings P1 of transformers Tx1, Tx2 continue to conduct current through the freewheeling diode D2 of the current-sharing circuit. Current through synchronous rectifiers Q4 and Q6 continues to be driven from the secondary windings S1 of the transformers TX1, TX2.

The voltage drop on freewheeling diode D2 is about four times lower than that of the body diode of power switch Q2. The separate current path introduced by freewheeling diode D2 of the current-sharing circuit allows current to be delivered to the load, so the currents I_Q3 and I_Q5 through synchronous rectifiers Q3 and Q5 decrease to zero. Synchronous rectifiers Q3 and Q5 are turned off, achieving ZCS.

Magnetic flux generated by current I_r2*N (where N is the number of turns of the transformer winding P1) through the primary windings P1 of transformers TX1, TX2 is canceled or partially canceled by magnetic flux generated by current I_r*N (where N is the number of turns of the transformer winding P2) through primary windings P2 of transformers TX1, TX2 because the currents I_r, I_r2 are in opposite directions. This is illustrated in the waveform diagram of FIG. 2B that shows positive current I_r2 and negative current I_r partially canceling each other. As a result, the input current ripple is reduced at the input capacitor, and the magnetic flux in the transformer cancels or reduces the transformer core losses.

As shown in FIG. 2B, when power switch Q2 is turned on, the current through the primary windings P2 of transformers TX1, TX2 is in the opposite direction to the current of the primary windings P1 of transformers TX1, TX2. This creates a magnetic flux in an opposite direction to that of the magnetic flux created by the current in windings P1.

Because the magnetic fluxes are in opposite directions, the total change in flux is lower in the magnetic core, resulting in lower core losses. Lower core losses reduce the needed size of the magnetics in the transformers TX1, TX2.

To help balance the circuit, it is important that the turns ratios of the windings P1:P2 is 1:1.

In the LLC converter of FIG. 1, capacitors C5, C6 are connected in parallel in a snubber circuit with the power switches Q1, Q2, respectively, to help reduce the switching losses of power switches Q1, Q2. When power switches Q1, Q2 are turned off, current will flow through capacitors C5, C6, and the LLC converter will not incur switching losses attributed to the power switches Q1, Q2. In a conventional LLC converter, when switching frequency is below the resonant frequency, hard switching, i.e. non-ZCS, of power switches Q1, Q2 occurs, which increases switching losses.

Figure 3A:
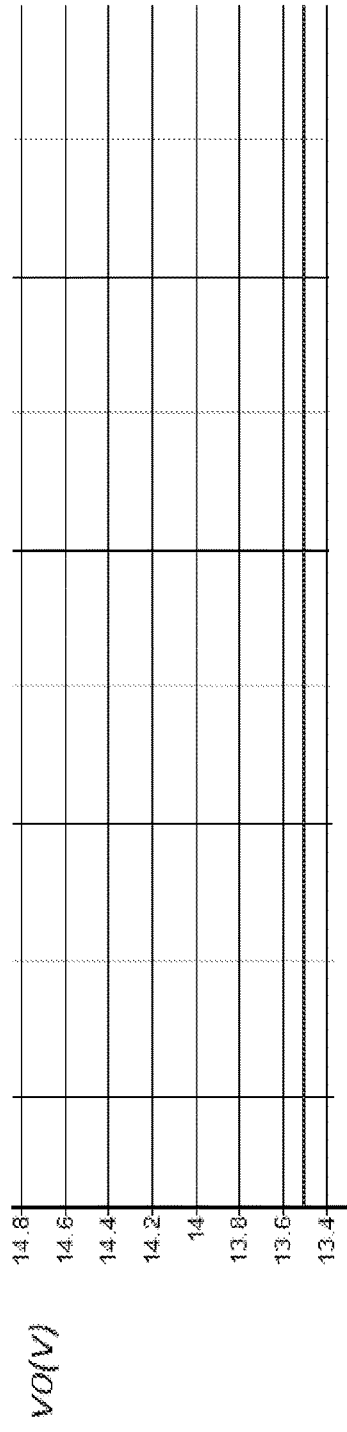
FIGS. 3A, 3B, and 3C illustrate exemplary voltage and current waveforms at several points in the LLC converter of FIG. 1.
Figure 3B:
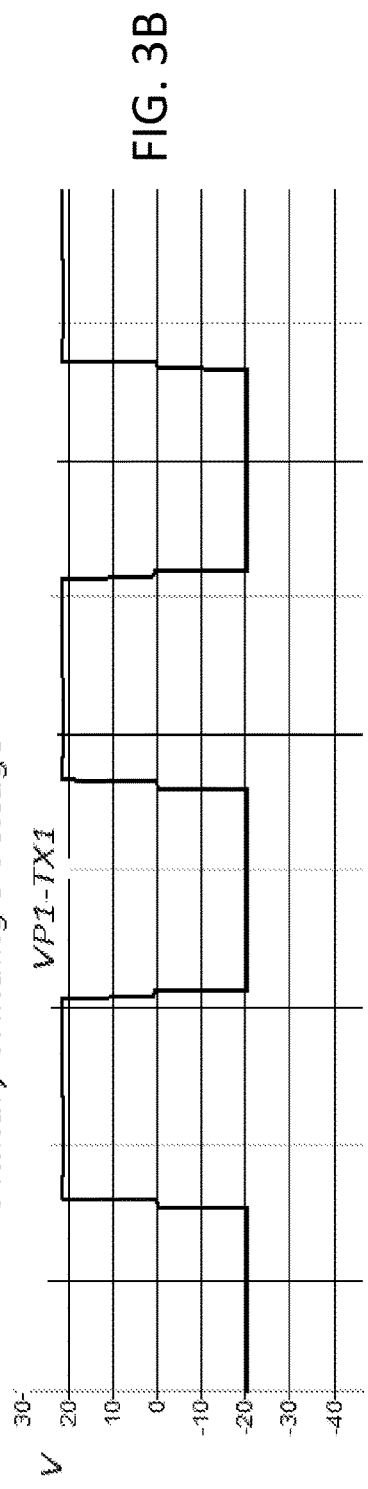
Figure 3C:
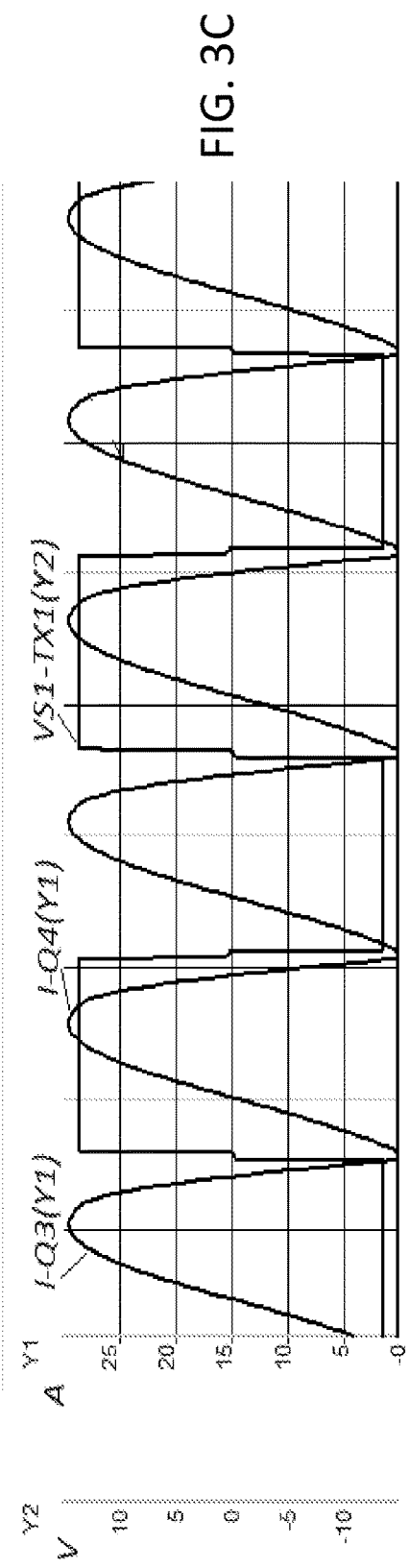

FIGS. 3A-3C illustrate additional waveforms of the LLC converter of FIG. 1. FIG. 3A shows a steady state DC output voltage Vo over time. FIG. 3B shows the voltage of the primary winding VP1_TX1 of the single transformer TX1 over time. FIG. 3C shows an overlay of the secondary winding voltage VS1_TX1 of the transformer TX1 along with the currents I_Q3 and I_Q4 of two synchronous MOSFET switches Q3 and Q4. FIGS. 3A-3C show that the LLC converter of FIG. 1 operates at frequencies below the resonant frequency. Because of magnetic flux cancellation in the LLC converter of FIG. 1, the synchronous MOSFETs Q3 and Q4 are switched at zero current to reduce losses.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An LLC converter that outputs a DC output voltage from a DC input voltage, the LLC converter comprising:
    a resonant circuit including a plurality of inductors connected to the DC input voltage;
    a switching circuit including a plurality of switches connected to the DC input voltage;
    a plurality of transformers each including a plurality of primary windings and a plurality of secondary windings; and
    a plurality of synchronous rectifiers each connected to one of the plurality of secondary windings and to ground; wherein
    the plurality of primary windings of each of the plurality of transformers includes a first primary winding and a second primary winding;
    the first primary windings of each of the plurality of transformers are connected in series;
    the second primary windings of each of the plurality of transformers are connected in series;
    the series-connected first primary windings are directly connected in parallel with the resonant circuit;
    the series-connected second primary windings are directly connected in parallel with the resonant circuit;
    a first current from a first switch of the plurality of switches flows into the series-connected first primary windings;
    a second current from a second switch of the plurality of switches flows into the series-connected second primary windings; and
    currents from each of the plurality of secondary windings are equal or substantially equal.

2. The LLC converter of claim 1, wherein a current through the series-connected first primary windings flows in an opposite direction to a current through the series-connected second primary windings.

3. The LLC converter of claim 1, further comprising a plurality of capacitors; wherein
    a corresponding capacitor of the plurality of capacitors is connected in parallel with a corresponding switch of the plurality of switches.

4. The LLC converter of claim 1, further comprising a plurality of freewheeling diodes; wherein
    a corresponding freewheeling diode of the plurality of freewheeling diodes is connected in series with a corresponding switch of the plurality of switches.

5. The LLC converter of claim 1, wherein
    a terminal of a first inductor of the plurality of inductors is connected in series with the series-connected first primary windings, and
    a terminal of a second inductor of the plurality of inductors is connected in series with the series-connected second primary windings.

6. The LLC converter of claim 1, wherein a turns ratio of the first primary winding to the second primary winding of each of the plurality of transformers is 1:1.

7. The LLC converter of claim 1, further comprising a control circuit that drives the plurality of switches and the plurality of synchronous rectifiers on and off.

8. The LLC converter of claim 1, wherein, in a current cycle, energy stored in the plurality of transformers during a previous cycle is transferred back to the DC input voltage.

9. An LLC converter that outputs a DC output voltage from a DC input voltage, the LLC converter comprising:
    a resonant circuit connected to the DC input voltage;
    a switching circuit including:
        a first switch including a first terminal connected to the resonant circuit and to the DC input voltage; and
        a second switch including a first terminal connected to the resonant circuit;
    a current-sharing circuit connected between the first and second switches;
    first and second transformers each including first and second primary windings; and
    a rectification circuit connected to the first and second transformers and to the DC output voltage; wherein
    the second terminal of the first switch is connected to the first primary winding of the first transformer;
    the second terminal of the second switch is connected to the second primary winding of the first transformer;
    the first primary windings of the first and second transformers are connected in series;
    the second primary windings of the first and second transformers are connected in series;
    the first primary winding of the second transformer is connected to the resonant circuit;
    the second primary windings of the first and second transformers are connected to the resonant circuit; and
    the current-sharing circuit provides current paths so that, when both of the first and second switches are off, energy stored in the first and second transformers is transferred back to the DC input voltage.

10. The LLC converter of claim 9, wherein:
    the resonant circuit includes:
        first and second capacitors connected in series; and
        first and second inductors connected to a node between the first and second capacitors;
    the first inductor is connected to the first primary winding of the second transformer; and
    the second inductor is connected to the second primary winding of the first transformer.

11. The LLC converter of claim 9, wherein the current-sharing circuit includes:
    first and second freewheeling diodes;
    an anode of the first freewheeling diode is connected to a second terminal of the second switch;
    a cathode of the first freewheeling diode is connected to the first terminal of the first switch;
    an anode of the second freewheeling diode is connected to the first terminal of the second switch; and
    a cathode of the second freewheeling diode is connected to a second terminal of the first switch.

12. The LLC converter of claim 9, wherein each of the first and second transformers includes first and second secondary windings.

13. The LLC converter of claim 12, wherein currents from the first and second secondary windings of the first and second transformers are equal or substantially equal.

14. The LLC converter of claim 9, wherein a current through the first primary windings of the first and second transformers flows in an opposite direction to a current through the second primary windings of the first and second transformers.

15. The LLC converter of claim 9, further comprising:
 a first capacitor connected in parallel with the first switch; and
 a second capacitor connected in parallel with the second switch.

16. The LLC converter of claim 9, wherein a turns ratio of the first primary winding to the second primary winding of each of the first and second transformers is 1:1.

17. The LLC converter of claim 9, further comprising a control circuit that provides drive signals to the rectification circuit and to the first and second switches of the switching circuit.

18. The LLC converter of claim 9, wherein:
 the rectification circuit includes first, second, third, and fourth synchronous rectifiers; and
 each of the first, second, third, and fourth synchronous rectifiers is connected to one of the first and second transformers and is connected to ground.

19. The LLC converter of claim 18, wherein the first, second, third, and fourth synchronous rectifiers are switched on and off at zero current.

20. The LLC converter of claim 19, wherein the first and second switches are switched at a frequency below a resonant frequency of the resonant circuit.

* * * * *